United States Patent
Cheng et al.

(10) Patent No.: US 10,663,796 B2
(45) Date of Patent: May 26, 2020

(54) BACKLIGHT MODULE AND CONTROLLING METHOD THEREOF, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Pengfei Cheng, Beijing (CN); Lei Chen, Beijing (CN); Xuqing Feng, Beijing (CN); Fei Gao, Beijing (CN); Xin Ma, Beijing (CN); Xuerong Wang, Beijing (CN); Lu Yu, Beijing (CN); Chuan Sun, Beijing (CN)

(73) Assignees: BEIJING BOE OPTOELECTRONICS TECHNOLOGY CO., LTD, Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/099,545

(22) PCT Filed: Feb. 12, 2018

(86) PCT No.: PCT/CN2018/076417
§ 371 (c)(1),
(2) Date: Nov. 7, 2018

(87) PCT Pub. No.: WO2019/010980
PCT Pub. Date: Jan. 17, 2019

(65) Prior Publication Data
US 2019/0146276 A1 May 16, 2019

(30) Foreign Application Priority Data
Jul. 10, 2017 (CN) .......................... 2017 1 0559994

(51) Int. Cl.
*G02F 1/1335* (2006.01)
*F21V 8/00* (2006.01)
(Continued)

(52) U.S. Cl.
CPC ..... *G02F 1/133605* (2013.01); *G02B 6/0031* (2013.01); *G02B 6/0051* (2013.01);
(Continued)

(58) Field of Classification Search
CPC ............. G02B 26/0833; G02B 6/0031; G02B 6/0051; G02B 6/0053; G02B 6/0033;
(Continued)

(56) References Cited

U.S. PATENT DOCUMENTS 7,542,197 B2 * 6/2009 Ishii ........................ G02B 1/118
359/290
8,773,613 B2 * 7/2014 Yankov .................. G02F 1/1336
349/61
(Continued)

FOREIGN PATENT DOCUMENTS

CN 1690793 A 11/2005
CN 104880822 A 9/2015
(Continued)

OTHER PUBLICATIONS

International Search Report of PCT/CN2018/076417 in Chinese, dated May 24, 2018, with English translation.
(Continued)

*Primary Examiner* — Peggy A Neils
(74) *Attorney, Agent, or Firm* — Collard & Roe, P.C.

(57) ABSTRACT

A backlight module, a controlling method thereof, and a display device are disclosed. The backlight module includes a light guide plate and at least one digital micro-mirror device located on a side of the light guide plate away from a light exiting surface. The at least one digital micro-mirror
(Continued)

device includes a plurality of micro-mirrors, and a reflective surface of each of the plurality of micro-mirrors faces the light guide plate. A local brightness of the backlight module is adjusted by controlling the micro-mirrors in the digital micro-mirror device.

20 Claims, 3 Drawing Sheets

(51) Int. Cl.
  *G02B 26/08* (2006.01)
  *G09G 3/34* (2006.01)
  *G02F 1/13357* (2006.01)

(52) U.S. Cl.
  CPC ......... *G02B 6/0053* (2013.01); *G02B 6/0055* (2013.01); *G02B 26/0833* (2013.01); *G02F 1/133606* (2013.01); *G09G 3/342* (2013.01); *G02F 2001/133607* (2013.01)

(58) Field of Classification Search
  CPC .. F02F 1/133605; F21V 11/183; F21V 14/04; F21V 7/00; G02F 1/133605
  See application file for complete search history.

(56) References Cited

U.S. PATENT DOCUMENTS

| | | | |
|---|---|---|---|
| 9,389,458 B2 * | 7/2016 | Chen | ................. G02F 1/133605 |
| 9,709,849 B2 * | 7/2017 | Lu | ..................... G02F 1/133605 |
| 10,126,484 B2 * | 11/2018 | Jeon | ..................... G02B 6/0031 |
| 2014/0321159 A1 * | 10/2014 | Lin | ..................... G02B 6/0031 |
| | | | 362/609 |
| 2017/0160539 A1 | 6/2017 | Jiang et al. | |
| 2017/0180687 A1 | 6/2017 | Wang | |

FOREIGN PATENT DOCUMENTS

| | | |
|---|---|---|
| CN | 104965348 A | 10/2015 |
| CN | 107144916 A | 9/2017 |
| JP | 2008209779 A | 9/2008 |

OTHER PUBLICATIONS

Notice of Transmittal of the International Search Report of PCT/CN2018/076417 in Chinese, dated May 24, 2018.

Written Opinion of the International Searching Authority of PCT/CN2018/076417 in Chinese, dated May 24, 2018 with English translation.

* cited by examiner

BACKLIGHT MODULE AND CONTROLLING METHOD THEREOF, AND DISPLAY DEVICE

CROSS REFERENCE TO RELATED APPLICATIONS

This application is the National Stage of PCT/CN2018/076417 filed on Feb. 12, 2018, which claims priority under 35 U.S.C. § 119 of Chinese Application No. 201710559994.4 filed on Jul. 10, 2017, the disclosure of which is incorporated by reference.

TECHNICAL FIELD

The present disclosure relates to a backlight module, a controlling method thereof, and a display device.

BACKGROUND

A backlight module provides a light source for a liquid crystal display (LCD) and is an important component of the LCD.

A conventional backlight module includes a light guide plate and a reflective sheet located on a side of the light guide plate away from a light exiting surface. The main function of the reflective sheet is to reflect light transmitted from the light guide plate back to the light guide plate, so as to enhance the brightness of the backlight module. The reflective sheet is a monolithic film, and the reflectivity of the entire film is substantially uniform in different regions, so that the light reflected to the light guide plate is substantially uniform in every regions.

Local brightness control is to control the brightness of the backlight in a localized manner. It is significant for improving dynamic range of the display, improving region contrast, and achieving a high-dynamic range (HDR).

When the brightness of the conventional display backlight module needs to be adjusted, the brightness is usually changed by adjusting the light source. However, this way of adjusting brightness causes the brightness of the entire light exiting region to be increased or decreased at the same time, which cannot achieve localized control of brightness.

SUMMARY

Some embodiments of the present disclosure provide a backlight module, including: a light guide plate; and at least one digital micro-mirror device, located on a side of the light guide plate away from a light exiting surface, wherein the at least one digital micro-mirror device includes a plurality of micro-mirrors, and a reflective surface of each of the plurality of micro-mirrors faces the light guide plate.

In some examples, an edge portion of the at least one digital micro-mirror device is connected with the light guide plate, and a gap is provided between an inner side of the edge portion of the at least one digital micro-mirror device and the light guide plate.

In some examples, the edge portion of the at least one digital micro-mirror device is connected with the light guide plate in a sealing manner, and the gap is vacuumed.

In some examples, the at least one digital micro-mirror device includes a plurality of digital micro-mirror devices, and the plurality of digital micro-mirror devices are spliced together.

In some examples, the plurality of micro-mirrors in the digital micro-mirror device are configured to be independently controlled, so as to change an included angle between the reflective surface of the micro-mirror and the light exiting surface of the light guide plate.

In some examples, each of the plurality of micro-mirrors is configured to be switched between a state in which the reflective surface is parallel with the light guide plate and a state in which the reflective surface is oblique with respect to the light guide plate towards two opposite directions.

In some examples, the backlight module further includes a light source, wherein the light source is located on a side surface of the light guide plate, or the light source is located on a side of the light guide plate opposite to the light exiting surface and is between the light guide plate and the at least one digital micro-mirror device.

In some examples, the micro-mirror in the digital micro-mirror device includes a silver reflective layer configured to form the reflective surface.

In some examples, the backlight module further includes an optical film located on a side of the light guide plate where the light exiting surface is located.

In some examples, the optical film includes a diffusion sheet, a lower prism sheet, and an upper prism sheet which are sequentially located on the side of the light guide plate where the light exiting surface is located.

In some examples, a sum of areas of the reflective surfaces of the plurality of micro-mirrors in the at least one digital micro-mirror device is substantially equal to an area of the light exiting surface of the light guide plate.

In some examples, in a state in which the reflective surfaces of the plurality of micro-mirrors in the at least one digital micro-mirror device are parallel with the light exiting surface of the light guide plate, edges of reflective surfaces of adjacent micro-mirrors in the plurality of micro-mirrors are in contact with each other.

Some embodiments of the present disclosure provide a display device, including: any one of the above-mentioned backlight module; and a display panel, wherein the backlight module is located on a side of the display panel where a light incident surface is located.

Some embodiments of the present disclosure provide a controlling method of any one of the above-mentioned backlight modules, including: controlling a local brightness of the backlight module by controlling the plurality of micro-mirrors in the at least one digital micro-mirror device.

In some examples, controlling the local brightness of the backlight module includes: dividing the backlight module into a plurality of backlight sub-regions, and controlling the micro-mirror in a backlight sub-region adjacent to a predetermined backlight sub-region in the plurality of backlight sub-regions to rotate, so that light emitted from the light guide plate and incident on the micro-mirror is reflected to the predetermined backlight sub-region.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and thus are not limitative of the present disclosure.

REFERENCE NUMERALS

10—light guide plate; 101—light exiting surface; 20—digital micro-mirror device; 201—micro-mirror; 30—optical film; 301—diffusion sheet; 302—lower prism sheet; 303—upper prism sheet.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Figure 1:
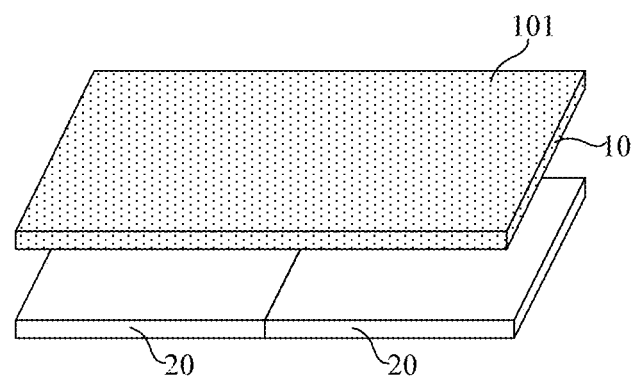
FIG. 1 is a first schematic view of a backlight module provided by the present disclosure.
Figure 2:
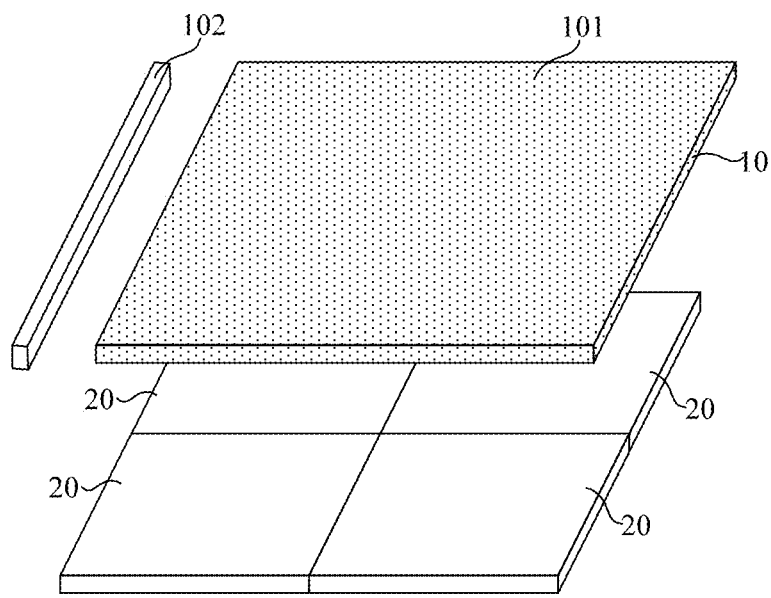
FIG. 2 is a second schematic view of a backlight module provided by the present disclosure.

The embodiments of the present disclosure provide a backlight module, as illustrated in FIG. 1 and FIG. 2, including a light guide plate 10, and at least one digital micro-mirror device (DMD) 20 located on a side of the light guide plate 10 away from a light exiting surface 101.

For example, the at least one digital micro-mirror device 20 includes a plurality of micro-mirrors 201, and a reflective surface of each of the plurality micro-mirrors 201 faces the light guide plate 10. Therefore, the light emitted from a side of the light guide plate 10 opposite to the light exiting surface can be reflected back to the light guide plate 10 through the reflective surfaces of the micro-mirrors 201.

Figure 3:
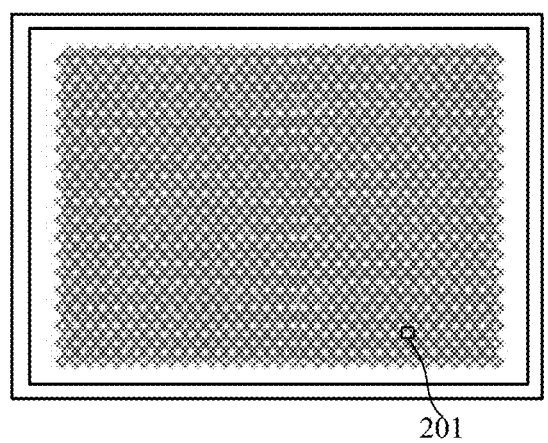
FIG. 3 is a schematic view of an array of micro-mirrors in a digital micro-mirror device provided by the present disclosure.

As illustrated in FIG. 3, the digital micro-mirror device 20 is an array device including a plurality of micro-mirrors 201. FIG. 3 only schematically illustrates four digital micro-mirror devices 20, but embodiments of the present disclosure are not limited thereto. There may be 100,000 or more micro-mirrors 201 in one digital micro-mirror device 20. Each of the plurality of micro-mirrors 201 can be controlled to change in three angles, and the three angles are respectively $\alpha$, and $\alpha \pm \beta$. The micro-mirror 201 is in a parallel state upon $\alpha$ being 0, and $\beta$ may be 10°, 12°, 17°, or the like. That is, each of the plurality of micro-mirrors 201 can be switched between a state in which the reflective surface is parallel with the light guiding plate, and a state in which the reflective surface is oblique with respect to the light guiding plate towards two opposite directions.

In the case that the micro-mirror 201 is in a parallel state, for example, $\alpha=0$, as illustrated in FIG. 4. For example, the micro-mirror 201 being in a parallel state may refer to that the reflective surface of the micro-mirror 201 is parallel with the light exiting surface of the light guide plate. In the case that all of the micro-mirrors 201 in the digital micro-mirror device 20 is in a parallel state, the digital micro-mirror device 20 allows the light transmitted from the light guide plate 10 to be substantially uniformly reflected back to the light guide plate 10 in the entire region of the light guide plate 10. In this case, the digital micro-mirror device 20 has the same function of as a conventional reflective sheet.

Figure 4A:
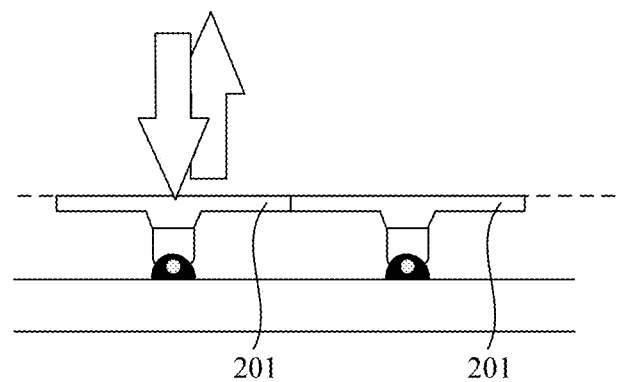
FIG. 4a is a schematic view illustrating a micro-mirror provided by the present disclosure being in a parallel state.
Figure 4B:
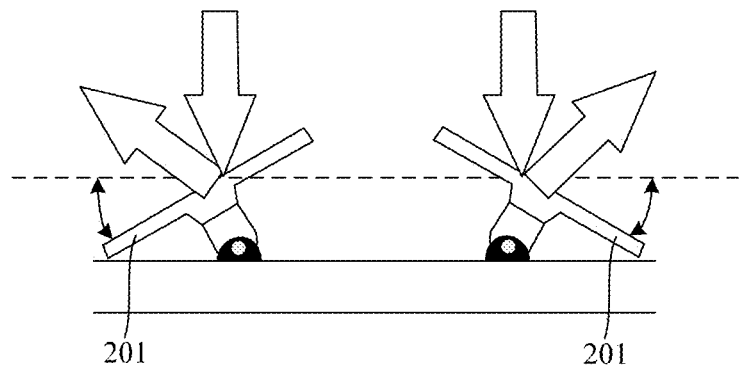
FIG. 4b is a schematic view illustrating a micro-mirror provided by the present disclosure after being rotated.

Upon the micro-mirror 201 being rotated, i.e., being rotated by an angle of $\beta$, as illustrated in FIG. 4b, light transmitted from the light guide plate 10 can be reflected towards a predetermined direction. For example, FIG. 4b illustrates two micro-mirrors with angles $\alpha+\beta$ and $\alpha-\beta$, respectively. Based on this, by controlling the micro-mirrors 201 in the digital micro-mirror device 20, the micro-mirrors 201 in a predetermined region can be rotated, so that the micro-mirrors 201 after being rotated allows the light to be reflected to a predetermined region, and the brightness of the predetermined region can be enhanced to achieve a purpose of local brightness control.

It should be understood that: the micro-mirror 201 is a reflective micro-mirror configured to reflect light incident thereon. For example, the plurality of micro-mirrors in the digital micro-mirror device are configured to be independently controlled, such that included angles between the reflective surfaces of the plurality of micro-mirrors and the light exiting surface of the light guide plate can be changed. For example, the digital micro-mirror device can be externally connected with a driving circuit to achieve that the plurality of micro-mirrors in the digital micro-mirror device can be independently controlled. Alternatively, the digital micro-mirror device itself may be integrated with a driving device. For example, the externally connected driving circuit or the integrated driving device can receive image display information, and drive the micro-mirrors to rotate according to the image display information. Because the plurality of micro-mirrors can be independently controlled, different regions can be controlled differently, thereby adjusting the local light exiting intensity of the backlight module. For example, if the light intensity required by two regions is different, the micro-mirrors corresponding to the two regions can be controlled to rotate, so that light corresponding to one region is reflected to the other region by the micro-mirror, thereby achieving the adjustment of the local light exiting intensity of the backlight module.

Due to the reflective characteristics of the digital micro-mirror device 20, the digital micro-mirror device 20 can be equivalent to a reflective sheet in the case that the digital micro-mirror device 20 is located on a side of the light guide plate 10 that is away from the light exiting surface 101.

Based on this, it should be understood by those skilled in the art that: in order to reflect the light emitted from the side of the light guide plate 10 that is away from the light exiting surface 101, the at least one digital micro-mirror device 20 located on the side of the light guide plate 10 away from the light exiting surface 101 can be capable of reflecting light in an entire region of the light panel 10. Arrangement can be provided according to the size of the light guide plate 10 and the digital micro-mirror device 20, in the case where the size of the light guide plate 10 is small, one or several digital micro-mirror devices 20 may be located on the side of the light guide plate 10 away from the light exiting surface 101, and in the case where the size of the light guide plate 10 is large, more digital micro-mirror devices 20 can be selected and located on the side of the light guide plate 10 away from the light exiting surface 101.

Furthermore, the shape of the light guide plate 10 is not limited herein, and the shape of the light guide plate 10 can be a flat plate shape as illustrated in FIGS. 1 and 2, or light guide plate 10 can be in other shapes, such as: in a wedge shape.

Regardless of what shape the light guide plate 10 is in, similar to configuration manner of the reflective sheet, the at least one digital micro-mirror device 20 can be located in a plane which is at a side of the light guide plate 10 away from the light exiting surface 101, and the plane is a plane located opposite to the light exiting surface 101.

For example, a sum of areas of the reflective surfaces of the plurality of micro-mirrors in the digital micro-mirror device is substantially equal to an area of the light exiting surface of the light guide plate, so that every region of the light guide plate corresponds to a micro-mirror, so as to control the light in each region.

For example, in the state where the reflective surfaces of the plurality of micro-mirrors in the digital micro-mirror device are parallel with the light exiting surface of the light guiding plate, edges of the reflective surfaces of adjacent micro-mirrors in the plurality of micro-mirrors are in contact with each other, as illustrated in FIG. 4a.

It should be understood by those skilled in the art that: the backlight module may further include a component, such as a back plate, a plastic frame, or the like, which is configured to fix the light guide plate 10 and the digital micro-mirror device 20.

A control board that controls the digital micro-mirror device 20 may be located in the backlight module or may be disposed independently from the backlight module. In the case that the control board of the digital micro-mirror device 20 is disposed independently from the backlight module, the digital micro-mirror device may be connected with the control board outside the backlight module through a connection line such as a flexible circuit board (FPC).

In consideration of thinning the backlight module, in the embodiments of the present disclosure, the control board of the digital micro-mirror device 20 can be disposed independently from the backlight module. In the case that the backlight module is applied to a display device, the control board can be located at other positions of the display device.

The embodiments of the present disclosure provide a backlight module, by providing at least one digital micro-mirror device 20 on a side of the light guide plate 10 away from the light exiting surface 101, and by controlling the micro-mirrors 201 in the digital micro-mirror device 20, the micro-mirror 201 in a predetermined region can be rotated, so that the micro-mirror 201 after being rotated allows the light to be reflected to a predetermined region and the brightness of the predetermined region can be enhanced, thereby achieving a purpose of local brightness control. Based on this, in the case where the backlight module is applied to a display device, the dynamic range of display can be improved, the region contrast can be improved, and a high dynamic range can be achieved.

In some examples, in the case that a plurality of digital micro-mirror devices 20 is provided, the plurality of digital micro-mirror devices 20 are spliced together.

Herein, the plurality of digital micro-mirror devices 20 being spliced together refers to that the plurality of digital micro-mirror devices 20 are closely arranged and the reflective surfaces of the micro-mirrors 201 are in the same plane.

In one aspect, the backlight module provided by the present disclosure can be applied to a large-sized display device. In the other aspect, the plurality of digital micro-mirror devices 20 which are spliced together can have relatively good performance on local brightness control.

In some examples, the light guide plate 10 may be further served as a protective plate for the micro-mirrors 201 in the digital micro-mirror device 20.

Because the micro-mirrors 201 are relatively fragile, generally, a whole piece of glass cover with high transmittance and high hardness is employed to be over the micro-mirrors 201 as a protective plate in the digital micro-mirror device 20. In the embodiments of the present disclosure, because the micro-mirrors 201 are located under the light guide plate 10, the original protective plate can be omitted, and the light guide plate 10 can further play a role of protecting the micro-mirrors 201.

Figure 5:
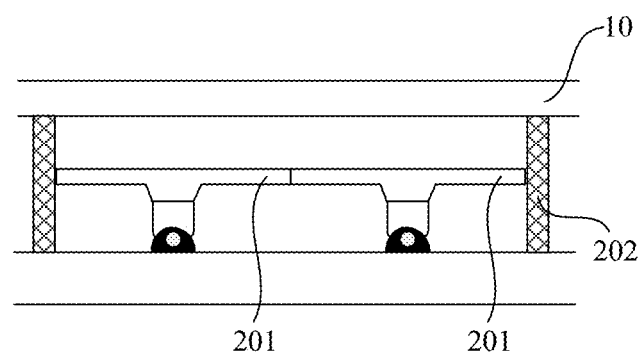
FIG. 5 is a schematic view illustrating a light guide plate provided by the present disclosure serving as a micro-mirror protective plate.

Because the micro-mirrors 201 need to be rotated, as illustrated in FIG. 5, a gap is provided between the light guide plate 10 and the micro-mirrors 201, the light guide plate 10 and the digital micro-mirror device 20 can be bonded together at edge, and the gap can be vacuumed. For example, as illustrated in FIG. 5, an edge portion of the digital micro-mirror device 20 can be sealed with the light guide plate by a sealing member 202, and a gap is formed between an inner side of the edge portion of the digital micro-mirror device 20 and the light guide plate. FIG. 5 only illustrates two micro-mirrors 201 for ease of illustration, but the digital micro-mirror device 20 may include more micro-mirrors. As illustrated in FIG. 5, the digital micro-mirror device 20 itself may include a substrate on which the micro-mirrors are formed, so as to form a sealed space between the substrate and the light guide plate. However, embodiments of the present disclosure are not limited thereto, and the sealed space can be formed by other substrates.

In the embodiments of the present disclosure, by making the light guide plate 10 play a role of protecting the micro-mirror 201, the thickness of the backlight module can be further reduced, which is more in line with the thinning design of the product.

In some examples, the micro-mirror 201 includes a silver reflective layer for forming the reflective surface.

With respect to an aluminum reflective layer, the silver reflective layer can further increase the reflectivity.

Figure 6:
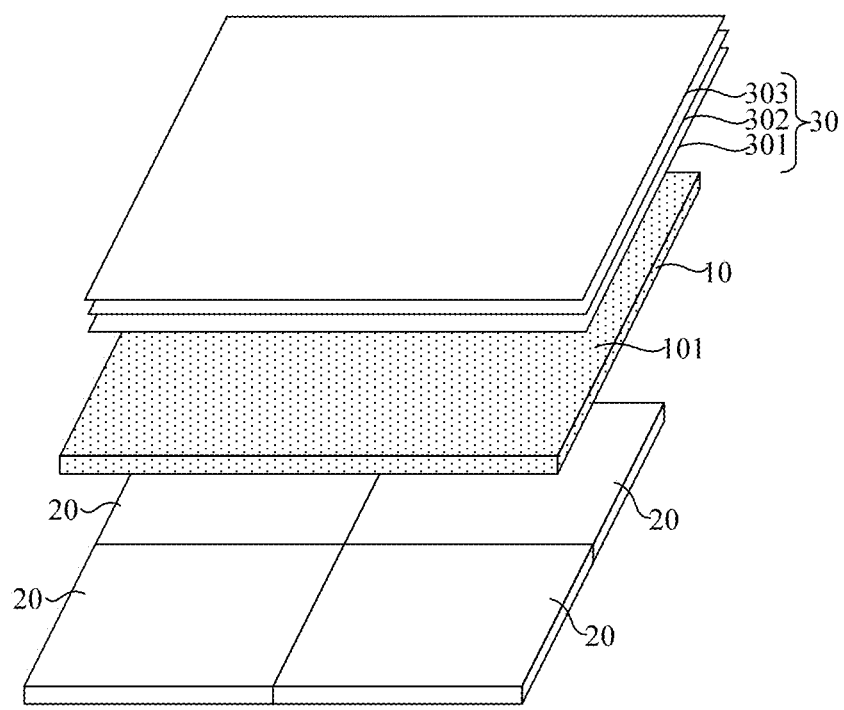
FIG. 6 is a third schematic view of a backlight module provided by the present disclosure.

In some examples, as illustrated in FIG. 6, the backlight module further includes an optical film 30 located on a side of the light guide plate where the light exiting surface 101 is located for optical improvement of different purposes.

Further, as illustrated in FIG. 6, the optical film 30 includes a diffusion sheet 301, a lower prism sheet 302, and an upper prism sheet 303 which are sequentially located on the side of the light guide plate where the light exiting surface 101 is located. In this way, the uniformity of the light emitted by the backlight module can be better.

In some examples, the backlight module further includes a light source 102 of light-emitting diode (LED) located on a side surface of the light guide plate 10, as illustrated in FIG. 2. FIG. 2 only schematically illustrates that the light source 102 is located on a side surface of the light guide plate 10, but the embodiments of the present disclosure are not limited thereto. For example, the light source 102 can be an LED light bar. The LED has the advantages such as small size, low power consumption and long service life.

The embodiments of the present disclosure further provide a display device, including the above-mentioned backlight module, and further including a display panel. For example, the backlight module is located on a side of the display panel where a light incident surface is located, so that the backlight module can provide a light source for the display panel. For example, the display panel can be a liquid crystal display panel that requires a backlight source, but embodiments of the present disclosure are not limited thereto. The display device with the above-mentioned backlight module can improve the dynamic range of the display device, improve the region contrast, and achieve a high dynamic range.

The display device can be a television, a notebook computer, a tablet computer, a smart phone, or the like.

The embodiments of the present disclosure further provide a controlling method of the above-mentioned backlight module, including: controlling a local brightness of the backlight module by controlling the plurality of micro-mirrors 201 in the digital micro-mirror device 20. The controlling method has the same technical effects as the above-mentioned backlight module, and the details are omitted herein.

In some examples, upon the micro-mirrors 201 being rotated, i.e., being rotated by an angle of β, as illustrated in FIG. 4b, light transmitted from the light guide plate 10 can be reflected towards a predetermined direction. Based on this, by controlling the micro-mirrors 201 in the digital micro-mirror device 20, the micro-mirror 201 in a predetermined region can be rotated, so that the micro-mirror 201 after being rotated allows the light to be reflected to a predetermined region, and the brightness of the predetermined region can be enhanced to achieve a purpose of local brightness control. In this case, it can be regarded that the backlight module works in a mode of local brightness control.

Optionally, controlling the local brightness of the backlight module includes: dividing the backlight module into a plurality of backlight sub-regions, and controlling the micro-mirror 201 in a backlight sub-region adjacent to a predetermined backlight sub-region to rotate, so that light is reflected to the predetermined backlight sub-region.

That is to say: the backlight module is divided into a plurality of backlight sub-regions, when it is required to control the brightness of one or more backlight sub-regions to be higher, a micro-mirror 201 in a backlight sub-region adjacent to the one or more backlight sub-regions can be controlled to rotate, so that light emitted from the light guide plate 10 and incident on the micro-mirror 201 which has been rotated can be reflected to the one or more backlight sub-regions, so as to enhance the brightness of the one or more backlight sub-regions, while the brightness of the backlight sub-region adjacent thereto is relatively low.

The division of the backlight sub-regions needs to be consistent with the division of regions on the display panel, so as to allow the backlight sub-regions with higher brightness to correspond to the regions with higher brightness on the display panel.

In some examples, the controlling method further includes controlling all of the micro-mirrors 201 to be in a parallel state.

In the case that the micro-mirror 201 is in a parallel state, for example, α=0, as illustrated in FIG. 4a. Upon all of the micro-mirrors 201 in the digital micro-mirror device 20 being in a parallel state, the digital micro-mirror device 20 allows the light transmitted from the light guide plate 10 to be substantially uniformly reflected back to the light guide plate 10 in the entire region of the light guide plate 10. In this case, the function of the digital micro-mirror device 20 is the same as that of a conventional reflective sheet. It can be regarded that the backlight module works in a normal mode.

Based on this, the backlight module can have two working modes, so that the backlight module can be applied more widely.

In the backlight module, the controlling method thereof, and the display device provided by the embodiments of the present disclosure, by providing at least one digital micro-mirror device on a side of the light guide plate away from the light exiting surface, and by controlling the micro-mirrors in the digital micro-mirror device, the micro-mirror in a predetermined region can be rotated, so that the micro-mirror which has been rotated allows the light to be reflected to a predetermined region and the brightness of the predetermined region can be enhanced, thereby achieving a purpose of local brightness control. Based on this, in the case where the backlight module is applied to a display device, the dynamic range of display can be improved, the region contrast can be improved, and a high dynamic range can be achieved.

The above are merely exemplary embodiments of the present disclosure, and are not intended to limit the scope of the present disclosure. The scope of the present disclosure is defined by the appended claims.

What is claimed is:

1. A backlight module, comprising:
   a light guide plate;
   a substrate; and
   at least one digital micro-mirror device, located on a side of the light guide plate away from a light exiting surface and located on the substrate,
   wherein the at least one digital micro-mirror device comprises a plurality of micro-mirrors, and a reflective surface of each of the plurality of micro-mirrors faces the light guide plate,
   wherein the backlight module further comprises a sealing member configured to bond the substrate with the light guide plate to form a sealed space, and the sealed space is vacuumed.

2. The backlight module according to claim 1, wherein the at least one digital micro-mirror device comprises a plurality of digital micro-mirror devices, and the plurality of digital micro-mirror devices are spliced together.

3. The backlight module according to claim 1, wherein the plurality of micro-mirrors are configured to be independently controlled, so as to change an included angle between the reflective surface of the micro-mirror and the light exiting surface of the light guide plate.

4. The backlight module according to claim 3, wherein each of the plurality of micro-mirrors is configured to be switched between a state in which the reflective surface is parallel with the light guide plate and a state in which the reflective surface is oblique with respect to the light guide plate.

5. The backlight module according to claim 1, further comprising a light source, wherein the light source is located on a side surface of the light guide plate.

6. The backlight module according claim 1, wherein the micro-mirror comprises a silver reflective layer configured to form the reflective surface.

7. The backlight module according to claim 1, further comprising an optical film located on a side of the light guide plate where the light exiting surface is located.

8. The backlight module according to claim 7, wherein the optical film comprises a diffusion sheet, a lower prism sheet, and an upper prism sheet which are sequentially located on the side of the light guide plate where the light exiting surface is located.

9. The backlight module according to claim 1, wherein a sum of areas of the reflective surfaces of the plurality of micro-mirrors in the at least one digital micro-mirror device is substantially equal to an area of the light exiting surface of the light guide plate.

10. The backlight module according to claim 1, wherein in a state in which the reflective surfaces of the plurality of micro-mirrors in the at least one digital micro-mirror device are parallel with the light exiting surface of the light guide plate, edges of reflective surfaces of adjacent micro-mirrors in the plurality of micro-mirrors are in contact with each other.

11. A display device, comprising:
the backlight module according to claim 1; and
a display panel,
wherein the backlight module is located on a side of the display panel where a light incident surface is located.

12. A controlling method of the backlight module according to claim 1, comprising:
controlling a local brightness of the backlight module by controlling the plurality of micro-mirrors in the at least one digital micro-mirror device.

13. The controlling method according to claim 12, wherein controlling the local brightness of the backlight module comprises:
dividing the backlight module into a plurality of backlight sub-regions, and controlling the micro-mirror in a backlight sub-region adjacent to a predetermined backlight sub-region in the plurality of backlight sub-regions to rotate, so that light emitted from the light guide plate and incident on the micro-mirror is reflected to the predetermined backlight sub-region.

14. The controlling method according to claim 13, wherein controlling the micro-mirror in the backlight sub-region adjacent to the predetermined backlight sub-region in the plurality of backlight sub-regions to rotate comprises:
rotating the micro-mirror towards a clockwise or counterclockwise direction.

15. The controlling method according to claim 13, wherein controlling the micro-mirror in the backlight sub-region adjacent to the predetermined backlight sub-region in the plurality of backlight sub-regions to rotate comprises:
switching the micro-mirror between a state in which the reflective surface is parallel with the light guide plate and a state in which the reflective surface is oblique with respect to the light guide plate.

16. The backlight module according to claim 1, wherein the digital micro-mirror device comprises a substrate on which the plurality of micro-mirrors are located, and a sealed space is provided between the substrate and the light guide plate.

17. The backlight module according to claim 1, wherein the light guide plate is further served as a protective plate for the plurality of micro-mirrors.

18. The backlight module according to claim 1, wherein the micro-mirror is rotatably connected with the substrate with a shaft.

19. The backlight module according to claim 1, wherein the micro-mirror is controlled to be rotated between an angle between −17° and 17°.

20. A backlight module, comprising:
a substrate;
a light guide plate, located on a side of the substrate;
at least one digital micro-mirror device, located on the substrate and located between the substrate and the light guide plate, wherein the at least one digital micro-mirror device comprises a plurality of micro-mirrors, and a reflective surface of each of the plurality of micro-mirrors faces the light guide plate; and
a sealing member, configured to bond the substrate with the light guide plate at edge to form a sealed space, wherein the sealed space is vacuumed.

* * * * *

UNITED STATES PATENT AND TRADEMARK OFFICE
CERTIFICATE OF CORRECTION

PATENT NO. : 10,663,796 B2  
APPLICATION NO. : 16/099545  
DATED : May 26, 2020  
INVENTOR(S) : Cheng et al.

Page 1 of 1

It is certified that error appears in the above-identified patent and that said Letters Patent is hereby corrected as shown below:

On the Title Page

Column 1, item (73), please change "BEIJING BOE OPTOELECTRONICS TECHNOLOGY CO., LTD, Beijing (CN); BOE TECHNOLOGY GROUP CO., LTD., Beijing (CN)" to correctly read:
--**BEIJING BOE OPTOELECTRONICS TECHNOLOGY CO., LTD.,
Beijing (CN); BOE TECHNOLOGY GROUP CO., LTD., Beijing (CN)**--.

Signed and Sealed this
Third Day of August, 2021

Drew Hirshfeld
*Performing the Functions and Duties of the
Under Secretary of Commerce for Intellectual Property and
Director of the United States Patent and Trademark Office*